(12) United States Patent
Steffenhagen

(10) Patent No.: US 10,343,588 B2
(45) Date of Patent: *Jul. 9, 2019

(54) RATCHET BUCKLE HAVING A SECOND REEL

(71) Applicant: Mark Steffenhagen, Diagonal, IA (US)

(72) Inventor: Mark Steffenhagen, Diagonal, IA (US)

( * ) Notice: Subject to any disclaimer, the term of this patent is extended or adjusted under 35 U.S.C. 154(b) by 61 days.

This patent is subject to a terminal disclaimer.

(21) Appl. No.: 15/704,148

(22) Filed: Sep. 14, 2017

(65) Prior Publication Data

US 2018/0001813 A1    Jan. 4, 2018

Related U.S. Application Data

(63) Continuation-in-part of application No. 14/721,306, filed on May 26, 2015, now Pat. No. 9,788,613.

(60) Provisional application No. 62/112,228, filed on Feb. 5, 2015.

(51) Int. Cl.
*B60P 7/08*    (2006.01)

(52) U.S. Cl.
CPC ............. *B60P 7/083* (2013.01); *B60P 7/0823* (2013.01)

(58) Field of Classification Search
CPC ................. B60P 7/083; B60P 7/0823
See application file for complete search history.

(56) References Cited

U.S. PATENT DOCUMENTS

| 6,547,218 | B2 | 4/2003 | Landy |
| 7,861,382 | B1* | 1/2011 | Madachy ............ B60P 7/0846 24/68 CD |
| 7,877,846 | B1 | 2/2011 | Chen |
| 2011/0146035 | A1* | 6/2011 | Lu .................. A44B 11/125 24/68 CD |
| 2011/0167599 | A1 | 7/2011 | Wright |
| 2011/0233493 | A1* | 9/2011 | Huang ................. B60P 7/083 254/250 |
| 2012/0110801 | A1 | 5/2012 | Joubert et al. |
| 2012/0241545 | A1* | 9/2012 | Borntrager ........... B60P 7/0846 242/395 |
| 2014/0061556 | A1 | 3/2014 | Knox |
| 2014/0345097 | A1 | 11/2014 | Hanlon |

FOREIGN PATENT DOCUMENTS

| DE | 3639712 A1 * | 6/1988 | ........... A44B 11/125 |
| DE | 3639712 A1 | 6/1988 | |

OTHER PUBLICATIONS

English Translation—DE3639712, Kennert, Rolf Dieter Dipl.

* cited by examiner

*Primary Examiner* — Victor D Batson
*Assistant Examiner* — Matthew J Sullivan
(74) *Attorney, Agent, or Firm* — Zarley Law Firm, P.L.C.

(57) ABSTRACT

A ratchet bucket having a first reel member rotatably connected to a frame having an anchor end and a lever end and also having a pair of arms. A lever is rotatably connected to the frame at a first end of the lever. A second reel member and a thumb knob are rotatably connected to a second end of the lever.

8 Claims, 6 Drawing Sheets

RATCHET BUCKLE HAVING A SECOND REEL

CROSS REFERENCE TO RELATED APPLICATION

This application is a continuation-in-part of U.S. patent application Ser. No. 14/721,306 filed May 26, 2015, which claims the benefit of U.S. Provisional Application Ser. No. 62/112,228 filed Feb. 5, 2015.

BACKGROUND OF THE INVENTION

This invention is directed to a ratchet buckle for reeling, tightening and tensioning straps and more particularly to a ratchet buckle having a second reel that retains all free-end, excess strap portions.

Ratchet buckles are well known in the art. Existing ratchet buckles provide a means for tensioning and tightening straps. Often, once a strap is tensioned, a free end hangs loosely from the ratchet buckle. This creates a nuisance and a safety issue as the free end needs to be tied or clamped down so that it does not flap around during operation. Thus, a need exists in the art for a device that addresses this deficiency.

An objective of the present invention is to provide a ratchet buckle capable of securing an end of a strap after tension.

Another objective of the present invention is to provide a ratchet buckle that is safer to use.

Yet another objective of the present invention is to provide a ratchet buckle capable of securing any excess portion of a strap after tension without any revolution of release.

These and other objectives will be apparent to one of ordinary skill in the art based upon the following written description, drawings, and claims.

SUMMARY OF THE INVENTION

A ratchet buckle having a first reel member rotatably connected to a frame having a pair of arms. A lever having a pair of arms rotatably mounted to the frame at a first end. A second reel member and a crank or a thumb knob rotatably mounted to the lever at a second end. The crank having an arm with a slot through which a locking plate extends or wherein a locking section includes the thumb knob.

DETAILED DESCRIPTION OF THE PREFERRED EMBODIMENT

Figure 1:
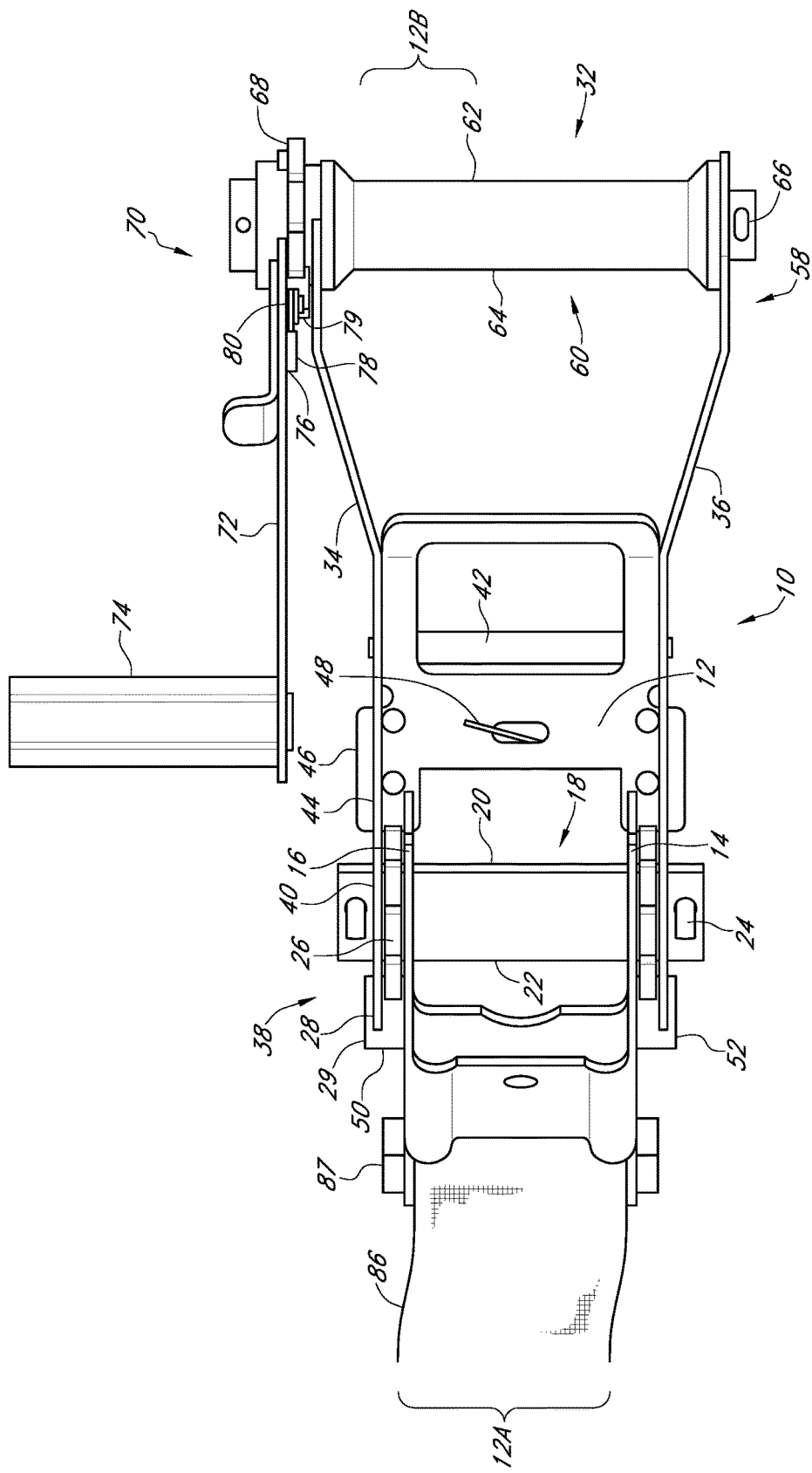
FIG. 1 is a rear view of a ratchet buckle having a second reel.
Figure 2A:
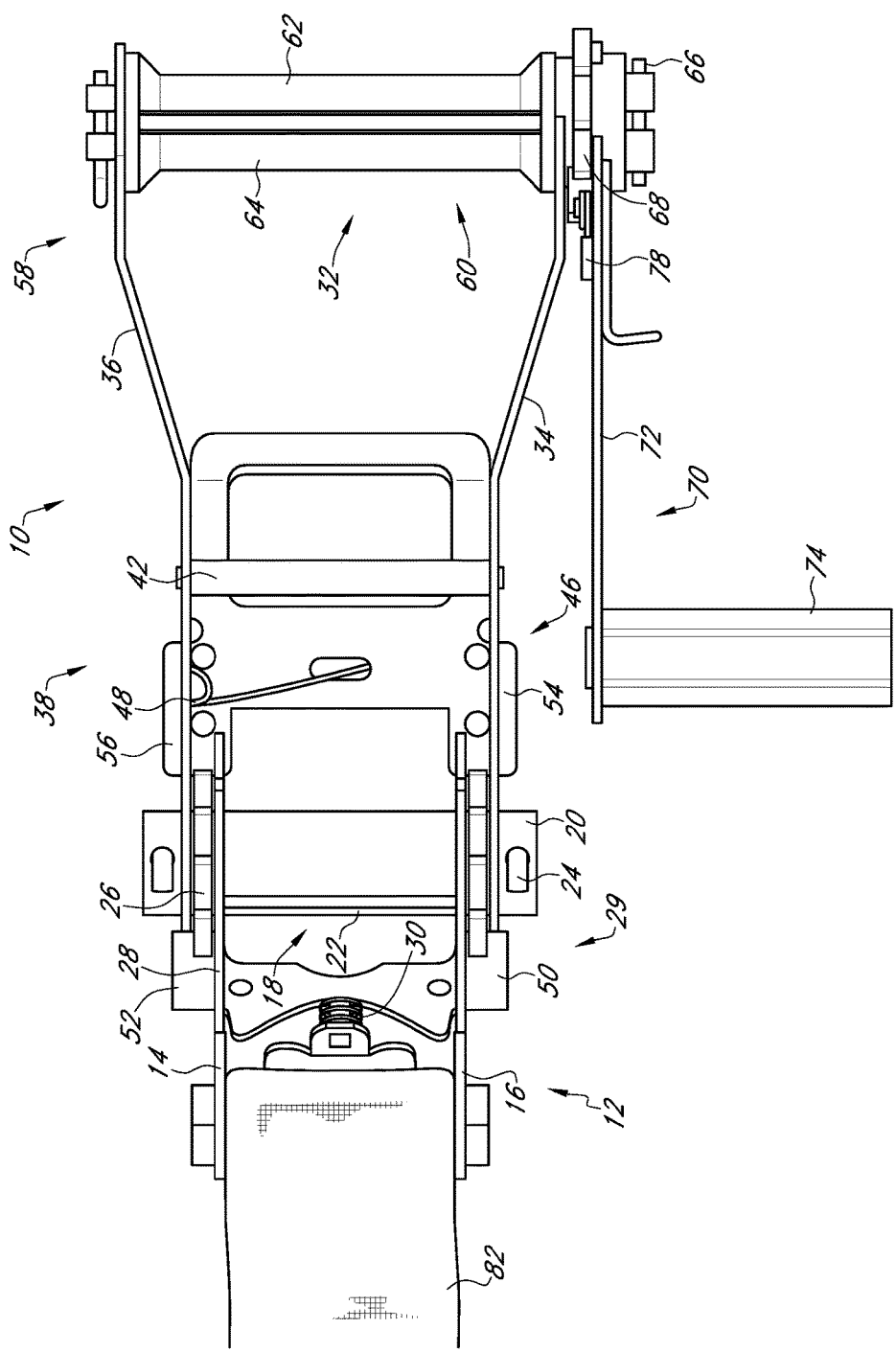
FIG. 2A is a front view of a ratchet buckle having a second reel and a crank.
Figure 2B:
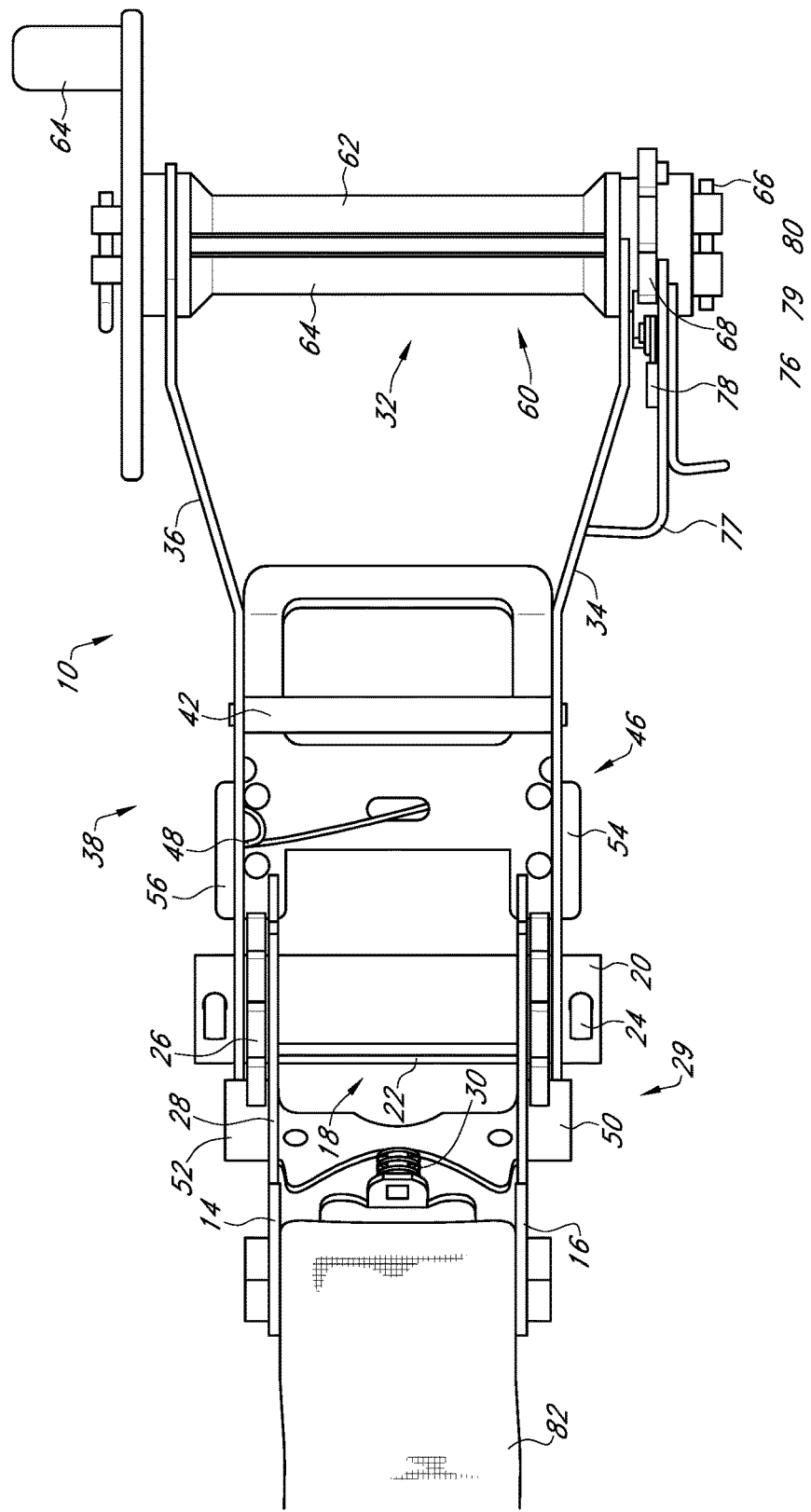
FIG. 2B is a front view of a ratchet buckle having a second reel and a thumb knob.

Referring to the figures, a ratchet buckle 10 has a frame 12 that includes a pair of arms 14 and 16. The frame 12 has an anchor end 12A and a lever end 12B that are opposite each other. An anchor strap 86 is wrapped about a bar 87 at the terminis of the anchor end 12A and terminates in an anchor member 88. A reel member 18 having a pair of bars 20 and 22 that are joined together at their ends by a pin 24, is rotatably mounted on frame 12 between arms 14 and 16. The reel member is positioned between the anchor end 12A of the frame 12 and the lever end 12B. Welded to an outer surface of arms 14 and 16 and positioned around the reel member 18 are a pair of ratchet wheels 26. The arms 14 and 16 have a pair of longitudinal slots 28 formed to receive a latching plate 29. The latching plate 29 is urged by a spring 30 which forces the end of the latching plate 29 to engage the ratchet wheels 26.

A lever 32 having a pair of arms 34 and 36 is rotatably mounted to the frame 12 between the ratchet wheels 26 and the pin 24. At a first end 38, the arms 34 and 36 have an opening 40 that receives the ends of the reel member 18. A bar member 42 extends between arms 34 and 36. Slidably mounted within elongated slots 44 of arms 34 and 36 is a second latch plate 46 that engages the ratchet wheels 26 in response to urging of spring 48 against latch plate 46.

The latch plate 29 has a pair of tabs 50 and 52 that extend outwardly from arms 14 and 16. The tabs 50 and 52 are positioned to be received in notches 54 and 56 formed on arms 34 and 36 when the lever 32 is in a closed position relative to the frame 12.

Rotatably mounted to a second end 58 of arms 34 and 36 is a second reel member 60 positioned at the lever end 12B of the frame 12. Preferably, as arms 34 and 36 extend away from the first end 38 toward the second end 58 they taper or angle outwardly away from one another. The second reel member 60 has a pair of bars 62 and 64 that are joined at their end by a pin 66. On one of the arms 34 and 36, mounted between the one arm (34 and 36) and pin 66 is a ratchet wheel 68 and a crank 70.

The crank 70 has an arm 72 rotatably mounted to the lever 32 between the pin 66 and the ratchet wheel 68. The opposite end of the arm 72 has a gripping member 74 that is generally perpendicular to the arm 72. Slidably mounted within a slot 76 in arm 72 is a third latching plate 78 that is urged against ratchet wheel 68 in response to spring 80. Slot 76 has a locking section 79 that extends transversely within arm 72 in relation to slot 76.

Figure 3:
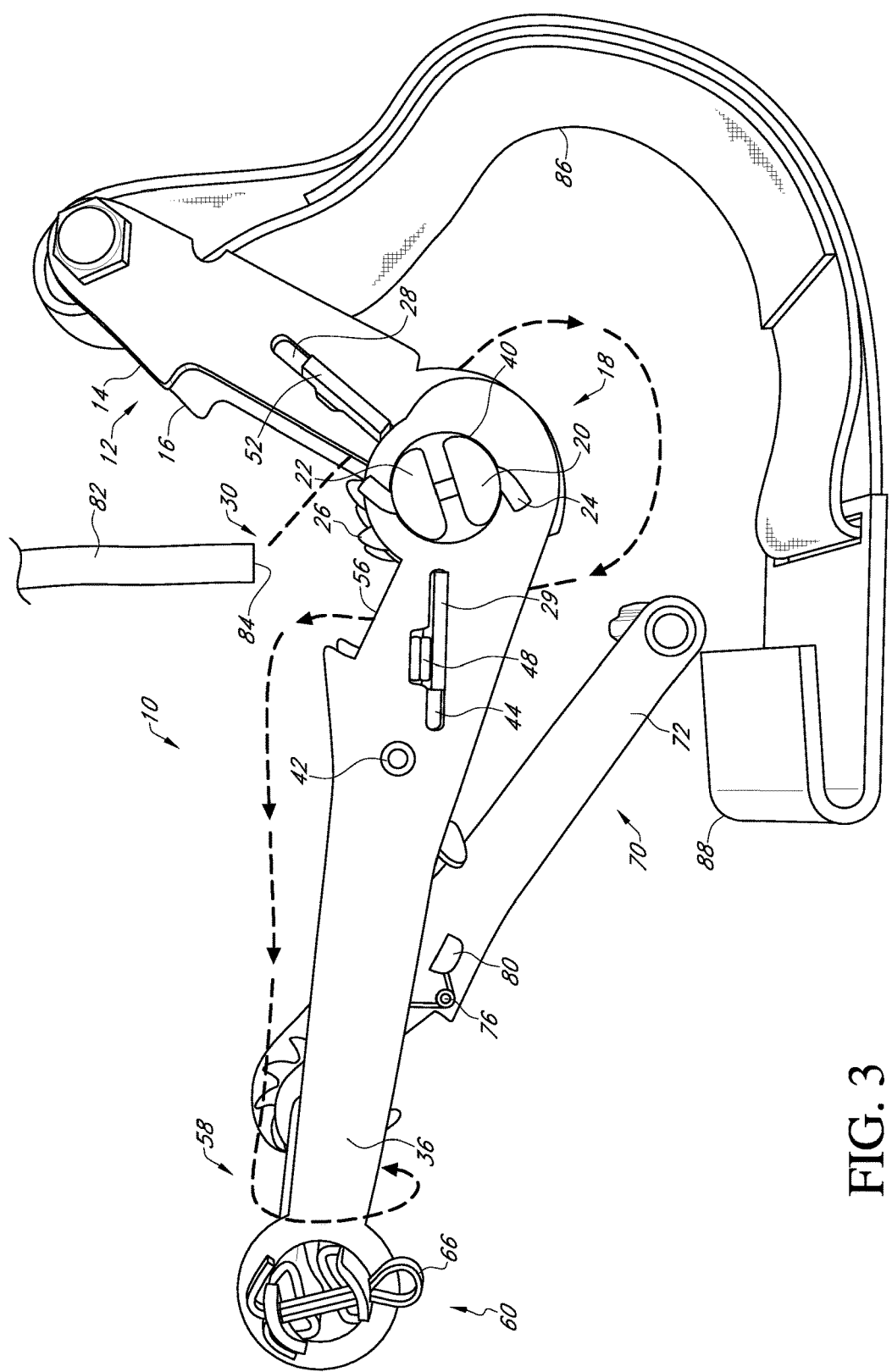
FIG. 3 is a side view of a ratchet buckle having a second reel.
Figure 4:
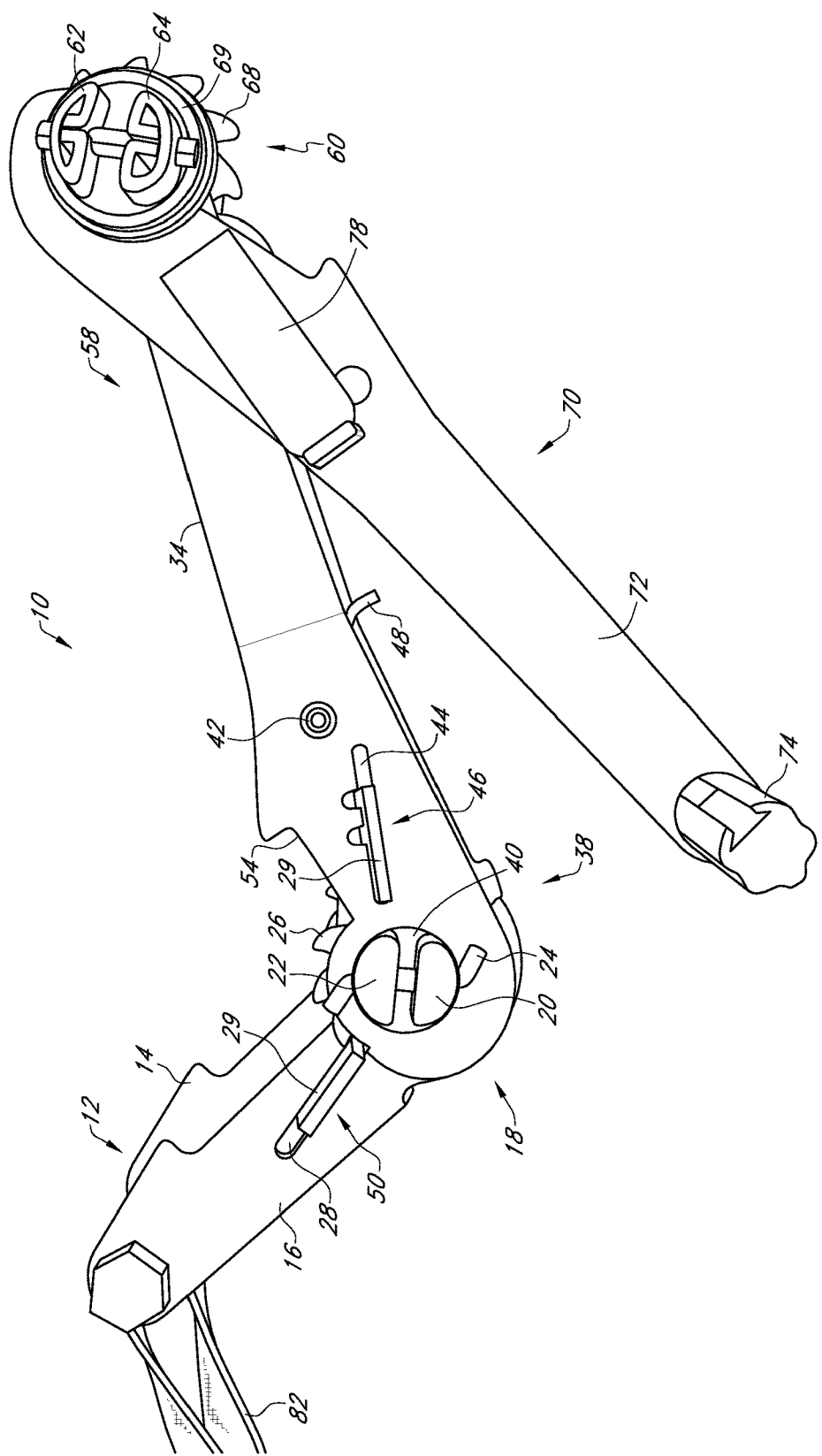
FIG. 4 is a side view of a ratchet buckle having a second reel.
Figure 5:
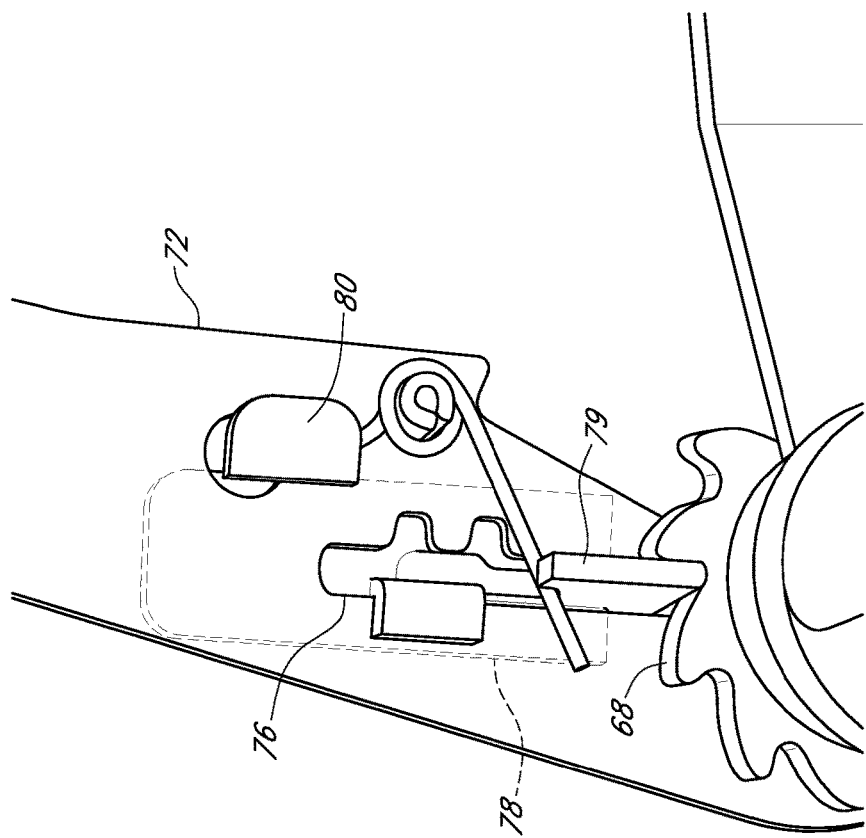
FIG. 5 is a side view of a locking section.

In operation, a retaining strap 82 is inserted between bars 20 and 22 of reel member 18 as shown in FIG. 3 represented by the dashed lines. The retaining strap 82 is tensioned by raising and lowering the lever 32 in relation to the frame 12 such that ratchet plate 46 drives ratchet wheels 26 as the lever 32 is moved away from the frame 12 with latching plate 28 retaining the ratchet wheel in position while the lever is moving downwardly and latching plate 46 moves over arcuate portions of the ratchet wheels 26.

When a tensioned condition is reached, a free end 84 of the strap 82 is inserted between bars 62 and 64 and the crank 70 is rotated such that the non-tensioned portion of the strap 82 is wrapped around the second reel member 60, as shown in FIG. 3 by the dashed lines. When wrapped, the third latching plate 78 retains the ratchet wheel 68 in position thus retaining the strap 82 taut along and against the ratchet buckle 10.

To release tension, the third latching plate 78 in manually pulled away from the ratchet wheel 68 and inserted in locking section 79 to hold the latching plate 68 away from engagement with the ratchet wheel 68. In this position, the second reel member 60 is free to rotate in the opposite direction which allows the strap 82 to unwind.

In an alternative embodiment, on one of the arms 34 and 36, mounted between the one arm (34 and 36) and pin 66 is a ratchet wheel 68 and a thumb knob 69. Instead of slot 76 being positioned on the arm 72 of the crank 70, the slot 76 is positioned on an extension portion 77 of the arm 34 of the lever 32. Slidably mounted within the slot 76 in the extension portion 77 is the third latching plate 78 that is urged against ratchet wheel 68 in response to spring 80. Slot 76 has a locking section 79 that extends transversely within the extension portion 77 in relation to slot 76.

The thumb knob 69 is rotatably mounted to the lever 32 opposite the ratchet wheel 68 and in communication with the ratchet wheel 68 and the slot 76 having a locking section 79. An anchor strap 86 loops around a bar 87 at the anchor end and terminates in an anchor member 88. During this alternative, in operation, when a tension condition is reached, the free end 84 of the strap 82 is inserted between bars 62 and 64 and the thumb knob 69 is rotated such that the non-tensioned portion of the strap 82 is wrapped around the second reel member 60. When wrapped, the third latching plate 78, along with the thumb knob 69, retains the ratchet wheel 68 in position thus retaining the strap 82 taut along and against the ratchet buckle 10.

What is claimed is:

1. A ratchet buckle, comprising:
   a first reel member ratchetly mounted to a frame having a pair of arms;
   a lever ratchetly mounted to the frame and having a pair of arms that receive the first reel member at a first end of the lever;
   a second reel member rotatably mounted to the pair of arms of the lever at a second end; and
   wherein the lever extends to and between the first end and the second end;
   a crank is rotatably mounted to the lever;
   a latching plate is slidably mounted within a slot in an arm of the crank.

2. The buckle of claim 1 wherein the pair of arms of the lever taper outwardly from the first end to the second end.

3. The buckle of claim 1 wherein the latching plate is urged forward by a spring to engage a ratchet wheel on the second reel member.

4. The buckle of claim 1 wherein the slot has a locking section.

5. The ratchet buckle of claim 1 wherein the frame comprises an anchor end and a lever end.

6. The ratchet buckle of claim 1 further comprising the first reel member having a first pair of bars that are joined by a first pin.

7. The ratchet buckle of claim 1 further comprising the second reel member having a second pair of bars that are joined by a second pin.

8. A ratchet buckle, comprising:
   a first reel member ratchetly mounted to a frame having a pair of arms;
   a lever ratchetly mounted to the frame and having a pair of arms that receive the first reel member at a first end of the lever;
   a second reel member rotatably mounted to the pair of arms of the lever at a second end;
   a crank is rotatably mounted to the lever; and
   a latching plate slidably mounted within a slot in an arm of the crank.

* * * * *